(12) United States Patent
Kito

(10) Patent No.: US 6,703,721 B1
(45) Date of Patent: Mar. 9, 2004

(54) SHIFT LEVER LOCK SYSTEM

(75) Inventor: Shozo Kito, Aichi-ken (JP)

(73) Assignee: Kabushiki Kaisha Tokai Rika Denki Seisakusho (JP)

( * ) Notice: Subject to any disclaimer, the term of this patent is extended or adjusted under 35 U.S.C. 154(b) by 0 days.

(21) Appl. No.: 09/644,353

(22) Filed: Aug. 23, 2000

(30) Foreign Application Priority Data

Aug. 31, 1999 (JP) ............................................. 11-245579

(51) Int. Cl.[7] ............................................. B60R 25/04
(52) U.S. Cl. ...................... 307/10.3; 307/10.2; 180/287
(58) Field of Search ............................... 307/9.1, 10.1, 307/10.2, 10.3, 10.6; 180/287, 289; 70/264, 278

(56) References Cited

U.S. PATENT DOCUMENTS

| | | | | |
|---|---|---|---|---|
| 4,433,487 A | * | 2/1984 | Roland | 33/539 |
| 4,965,460 A | * | 10/1990 | Tanaka et al. | 180/287 |
| 4,982,584 A | * | 1/1991 | Takeda et al. | 180/287 |
| 5,078,242 A | * | 1/1992 | Ratke et al. | 192/220.4 |
| 5,117,664 A | * | 6/1992 | Kurozu et al. | 70/252 |
| 5,127,245 A | * | 7/1992 | Imai et al. | 192/219.4 |
| 5,150,593 A | * | 9/1992 | Kobayashi et al. | 70/248 |
| 5,431,244 A | * | 7/1995 | Possobom | 180/287 |
| 5,491,470 A | * | 2/1996 | Veligdan | 180/287 |
| 5,734,330 A | * | 3/1998 | Nakamura | 307/10.2 |
| 5,841,363 A | * | 11/1998 | Jakob et al. | 180/287 |
| 5,842,384 A | * | 12/1998 | Berger | 74/529 |
| 5,869,908 A | * | 2/1999 | Moczygemba et al. | 180/287 |
| 6,043,752 A | * | 3/2000 | Hisada et al. | 340/5.26 |
| 6,057,682 A | * | 5/2000 | McCurley et al. | 200/61.88 |
| 6,188,140 B1 | * | 2/2001 | Kito et al. | 180/287 |
| 6,236,121 B1 | * | 5/2001 | Kemmann et al. | 180/287 |

FOREIGN PATENT DOCUMENTS

| | | | |
|---|---|---|---|
| JP | 09-124058 | * | 11/1997 |
| JP | 10-194087 | * | 7/1998 |

OTHER PUBLICATIONS

Patent Abstracts of Japan Application No. 08–124058, Published: Nov. 4, 1997, Start Control Device for Vehicle Provided With Electric Motor For Traveling.*

Patent Abstrats of Japan—Publication No.: 10–194087, Date of Publication: Jul. 28, 1998, Vehicle Burglar Prevention Device—Full computer generated translation of JP–10–194087.*

Patent Abstrats of Japan—Publication No.: 09–286252, Date of Publication: Nov. 4, 1997, Start Control Device for Vehicle Provided with Electric Motor for Traveling.*

Hideaki Mutsui and Yutaka Taga, Start Controller of Vehicle Equipped with Electromotor for Traveling, English translation, 24 pages, Pub. date: Nov. 4, 1997.*

* cited by examiner

*Primary Examiner*—Gregory J. Toatley, Jr.
*Assistant Examiner*—Sharon A. Polk
(74) *Attorney, Agent, or Firm*—TraskBritt

(57) ABSTRACT

A vehicle immobilizer locks the transmission shift lever in the park position. A key has an identification code and a transmitter. When the key is inserted into a key cylinder and used to rotate the key cylinder to start the vehicle, a code detector reads the key code. The key code is then compared to a prestored key code. If the key codes match, a first detection signal is generated. A brake detector detects when the brake pedal has been depressed and generates a second detection signal. When both the first and second detection signals are generated, the shift lever is unlocked and an engine ECU is enabled so that the engine may be started and the transmission may be engaged.

6 Claims, 4 Drawing Sheets

SHIFT LEVER LOCK SYSTEM

BACKGROUND OF THE INVENTION

The present invention relates to a shift lever lock system, and more particularly, to a vehicle shift lever lock system that locks a shift lever to prevent unauthorized use of the vehicle.

A known steering wheel lock apparatus is installed in a vehicle, such as an automobile to prevent unauthorized use of the vehicle. The steering wheel lock apparatus includes a key cylinder, which is accommodated in a lock body of the vehicle. A key inserted into a key rotor of the key cylinder rotates the key rotor to a LOCK position and is removed from the key rotor at the LOCK position. This engages a lock bar to a steering shaft and locks the steering shaft. In other words, the steering wheel is prevented from being rotated.

When the key is inserted into the key rotor, and the key rotor is rotated to an operational position (ACC, ON, START positions), a cam of a camshaft, which rotates integrally with the key rotor, moves the lock bar. This disengages the lock bar from the steering shaft and unlocks the steering wheel. The rotation of the camshaft also manipulates an ignition switch.

The steering wheel lock apparatus prevents rotation of the steering wheel and manipulation of the ignition switch unless a proper key is inserted into the key cylinder. Thus, the steering wheel lock system effectively prevents unauthorized use of the vehicle.

However, the steering wheel lock apparatus can be inconvenient. For example, when the steering wheel is in a rotated state, a rotating force is applied to the steering shaft. In such state, the key may not be removed from the key rotor.

SUMMARY OF THE INVENTION

It is an object of the present invention to provide a shift lever lock system that effectively prevents unauthorized use of a vehicle.

To achieve the above object, the present invention provides a vehicle immobilizer including a key rotor for receiving a key, which is used to rotate the key rotor, a shift lever lock mechanism for locking a transmission shift lever, and a detector that detects whether the key received by the key rotor is proper. The detector unlocks the shift lever with the shift lever lock mechanism when the proper key is detected and locks the shift lever with the shift lever lock mechanism when detecting that the key is improper.

A further aspect of the present invention provides a vehicle immobilizer including a key rotor for receiving a key, which is used to rotate the key, a shift lever lock mechanism for locking a transmission shift lever, and a detector that detects rotation of the key rotor. The detector unlocks the shift lever with the shift lever lock mechanism when detecting the rotation of the key rotor and locks the shift lever with the shift lever lock mechanism when the rotation of the key rotor is not detected.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
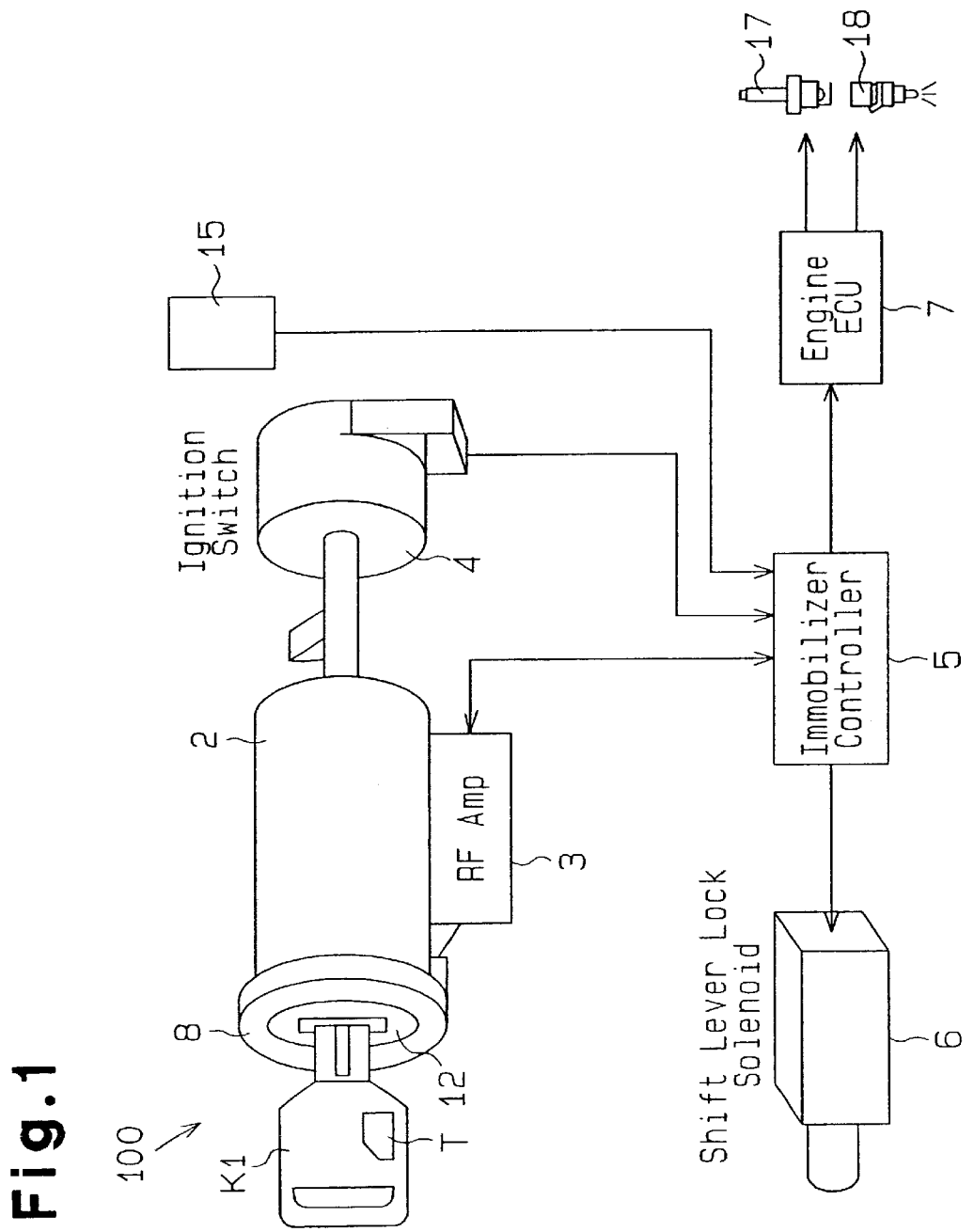
FIG. 1 is a schematic block diagram showing a shift lever lock system according to a first embodiment of the present invention.

In the drawings, like numerals are used for like elements throughout.

[First Embodiment]

FIG. 1 is a schematic block diagram showing a shift lever lock system 100 according to a first embodiment of the present invention.

As shown in FIG. 1, the shift lever lock system 100 includes an immobilizer key K1, which a driver uses to start an engine, a key cylinder 2, which is installed in an automobile, a radio frequency amplifier (RF amp) 3, an ignition switch 4, an immobilizer controller 5, a shift lever lock solenoid 6, and an engine electronic control unit (ECU) 7.

The immobilizer controller 5 is connected to the RF amp 3. When the immobilizer key K1 rotates a key rotor 12 of the key cylinder 2 to a predetermined position, the immobilizer controller 5 provides an oscillation signal to the RF amp 3. The RF amp 3 amplifies the oscillation signal and provides the amplified signal to an antenna coil 8, which is wound about the key rotor 12. The antenna coil transmits the oscillation signal to a transponder (code transmitter) T incorporated in the immobilizer key K1.

The transponder T receives power from the oscillation signal (electromagnetic energy) transmitted from the antenna coil 8 and uses the power to transmit a stored key (immobilizer) identification code (first key code) to the antenna coil 8. The immobilizer controller 5 receives the immobilizer identification code transmitted from the transponder T via the antenna coil 8 and the RF amp 3.

When the immobilizer key K1 is inserted into the key rotor 12, the key rotor 12 may be rotated from the LOCK position to operational positions, or ACC, ON, and START positions. When the key rotor 12 is rotated to the ON position, the ignition switch 4 provides the immobilizer controller 5 with an IG circuit ON signal. This provides the immobilizer controller 5 with a predetermined voltage from a battery (not shown) and activates the immobilizer controller 5. The activated immobilizer controller 5 provides an oscillation signal to the RF amp 3.

The immobilizer controller 5 includes a CPU (comparator), a ROM, an EEPROM, and a RAM. The EEPROM stores a reference identification code (second key code), which is identical to the immobilizer identification code of the key K1. The immobilizer controller 5 receives the immobilizer identification code transmitted from the immobilizer key K1. The CPU determines whether the immobilizer identification code matches the reference identification code. If the two codes match, the CPU determines that the proper key is being used.

The immobilizer controller 5 is connected to a brake lamp switch (brake detector) 15. The brake lamp switch 15 goes on when a brake pedal, which is located in front of the driver's seat, is depressed and provides a brake depression signal to the immobilizer controller 5. When the brake depression signal is received and the identification codes match, the immobilizer controller 5 provides an excitation signal to the shift lever lock solenoid 6, which serves as a shift lever lock mechanism. If the brake depression signal is not received or if the identification codes do not match, the immobilizer controller 5 provides a de-excitation signal to the shift lever lock solenoid 6.

The excitation signal excites the shift lever lock solenoid 6 and unlocks the shift lever (not shown). This permits the shift lever to be moved between parking (P), reverse (R), drive (D), second (2), and low (1) positions. The de-excitation signal de-excites the shift lever lock solenoid 6. In this state, the shift lever is locked at the parking (P) position and prevents the shift lever from being shifted.

The immobilizer controller 5 is connected to the engine ECU 7. When the immobilizer controller 5 receives the brake depression signal from the brake lamp switch 15 and the identification codes match, the immobilizer controller 5 provides the engine ECU 7 with an engine drive permission signal, which enables the engine to be started. The immobilizer controller 5 does not provide the engine ECU 7 with an engine drive permission signal if the brake depression signal is not received or if the identification codes do not match. When receiving the engine drive permission signal, the ECU 7 controls an ignition plug 17 and a fuel injection valve 18 to start the engine and allow the automobile to be driven.

In this embodiment, the RF amp 3, the immobilizer controller 5, and the antenna coil 8 form a detector. The conventional steering wheel lock apparatus is not installed in the automobile of the first embodiment.

The operation of the shift lever lock system 100 will now be described. The operation of the system 100 when the proper immobilizer key K1 is inserted into the key rotor 12 of the key cylinder 2 to drive the automobile will first be discussed.

In this case, when the key rotor 12 is rotated to the ON position by the immobilizer key K1, the immobilizer controller 5 transmits the oscillation signal to the transponder Tl of the immobilizer key K1 via the RF amp 3 and the antenna coil 8. The transponder T obtains power from the oscillation signal and transmits the immobilizer identification code to the immobilizer controller 5 via the antenna coil 8 and the RF amp 3.

The immobilizer controller 5 determines whether the immobilizer identification code stored on the key K1 matches the reference identification code stored in the EEPROM of the controller 5. In this case, the two identification codes match since the proper immobilizer key K1 is inserted into the key rotor 12.

When the brake pedal is depressed, the brake lamp switch 15 goes on. This causes the brake lamp switch 15 to provide the immobilizer controller 5 with the brake depression signal. In this state, the immobilizer controller 5 provides the shift lever lock solenoid 6 with the excitation signal and the engine ECU 7 with the engine drive permission signal. This excites the shift lever lock solenoid 6 and permits shifting of the shift lever thereby enabling the engine to be driven by the engine ECU 7. Thus, the automobile is allowed to be driven.

The operation of the system 100 when an improper immobilizer key is inserted into the key rotor 12 of the key cylinder 2 to drive the automobile (e.g., when a person tries to wrongfully start the automobile) will now be discussed. It will be assumed here that the improper immobilizer key can rotate the key rotor 12 to the ON position.

In this case, when the transponder, if any, of the improper immobilizer key obtains power from the oscillation signal transmitted by the immobilizer controller 5, the improper immobilizer key transmits an identification code, which differs from the proper identification code, to the immobilizer controller 5. If the key does not have a stored code, no code is transmitted to the RF amp 3 and the controller 5.

With the wrong key, the immobilizer identification code does not match the reference identification code, so the immobilizer controller 5 provides the shift lever lock solenoid 6 with a de-excitation signal and does not provide the engine drive permission signal to the engine ECU 7. In this state, the shift lever is locked and the engine cannot be started. Thus, the automobile cannot be driven.

The first embodiment has the advantages described below.

(1) When the proper immobilizer key K1 is inserted into the key rotor 12, the immobilizer identification code transmitted from the transponder T of the key K1 matches the prestored reference identification code. In this state, the immobilizer controller 5 excites the shift lever lock solenoid 6 and releases the shift lever from the locked state. When an improper key is inserted into the key rotor 12, the identification code of the key does not match the reference identification code. In this state, the immobilizer controller 5 keeps the shift lever locked at the parking (P) position with the shift lever lock solenoid.

Accordingly, if an improper key is used in an attempt to start the automobile, the locked state of the shift lever is maintained and unauthorized use of the automobile is prevented.

(2) If an improper key is used in an attempt to start the automobile, shifting of the shift lever is prohibited and the engine cannot be started. Thus, the prevention of unauthorized use of the automobile is further guaranteed.

(3) The shift lever is unlocked when the brake pedal is being depressed. This prevents the automobile from moving suddenly when the engine is started.

(4) In the first embodiment, instead of the conventional steering wheel lock apparatus being employed, a shift lever lock is employed. This eliminates the need for the various parts of the steering wheel lock apparatus (e.g., lock bar) and prevents unauthorized use of the automobile with a relatively small number of parts.

[Second Embodiment]

Figure 3:
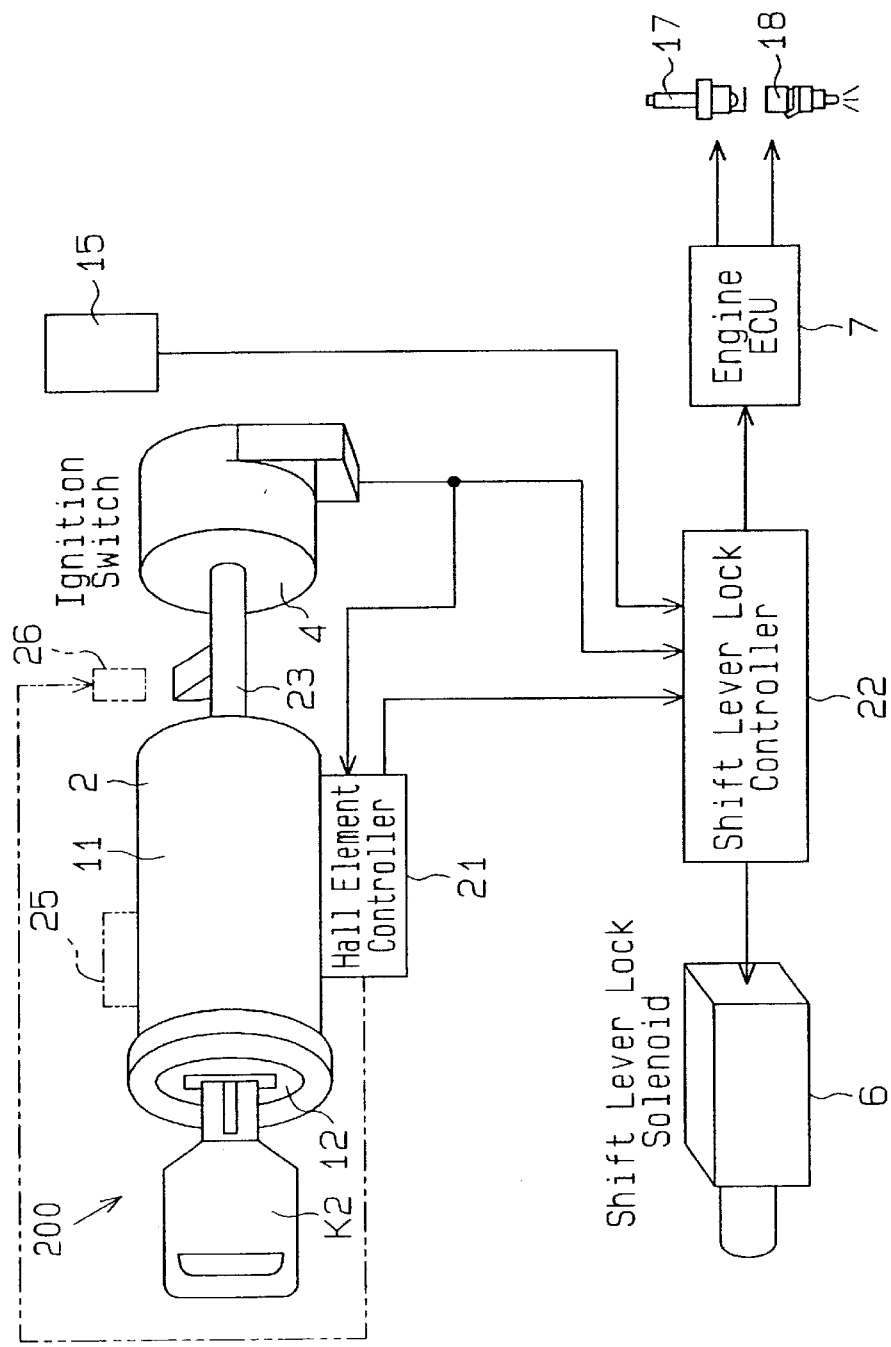
FIG. 3 is a schematic block diagram showing the shift lever lock-system of the second embodiment.

FIG. 3 is a schematic block diagram showing a shift lever lock system 200 according to a second embodiment of the present invention.

As shown in FIG. 3, the shift lever lock system 200 includes a key cylinder 2, a Hall element controller determination circuit) 21, an ignition switch 4, a shift lever lock controller 22, a shift lever lock solenoid 6, and an engine ECU 7.

Figure 2A:
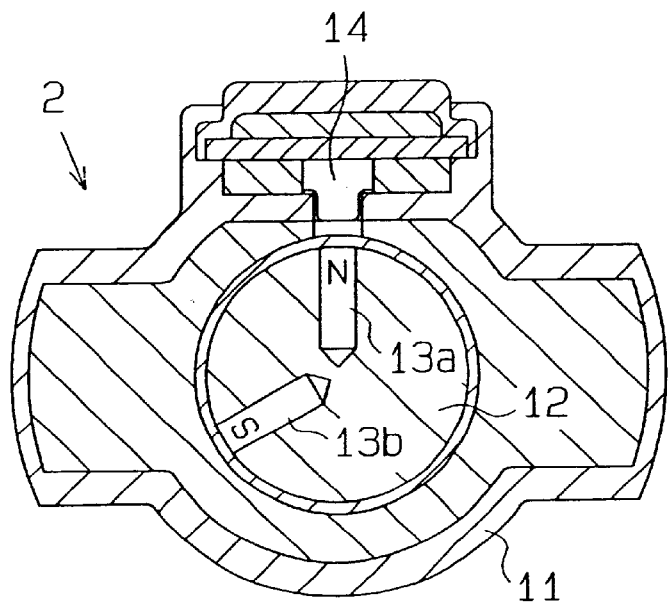
FIG. 2(a) is a front cross-sectional view showing a key cylinder of a shift lever lock system according to a second embodiment of the present invention.
Figure 2B:
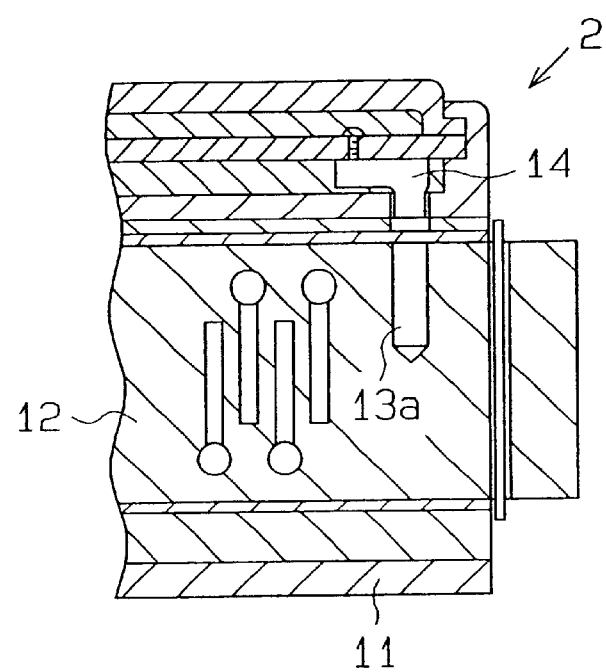
FIG. 2(b) is a side cross-sectional view of the key cylinder of FIG. 2(a)

In the second embodiment, as shown in FIGS. 2(*a*) and 2(*b*), the key cylinder 2 includes a rotor case 11 and a key rotor 12, which is rotatably supported in the rotor case 11. Two magnets 13*a*, 13*b*, which serve as detected members, are embedded separately in the key rotor 12. A Hall element 14, which serves as a position sensor, is arranged in the rotor case 11 to generate an output signal (Hall voltage) in accordance with the intensity of the magnetic fields of the magnets 13*a*, 13*b*.

When the key K2 is inserted into the key rotor 12, the key rotor 12 may be rotated from the LOCK position to operational positions, or ACC, ON, and START positions. The key K2 does not have a transponder.

When the key rotor 12 is located at the LOCK position, the N pole of the magnet 13a is opposed to the Hall element 14. When the key rotor 12 is rotated to the ON position, the S pole of the magnet 13b is opposed to the Hall element 14. Further, when the key rotor 12 is rotated to each position, a camshaft 23 (FIG. 3) rotates the ignition switch 4 integrally with the key rotor 12. The ignition switch 4 outputs a position signal corresponding to each position.

The Hall element controller 21 is located near the key cylinder 2. When the Hall element controller 21 receives a detection signal from the Hall element 14, the Hall element controller 21 determines whether the Hall element 14 is opposed to the N pole (magnet 13a), the S pole (magnet 13b), or no poles (neither opposed to the N pole nor the S pole) based on the value of the detection signal (Hall voltage value).

The Hall element controller 21 receives the position signal from the ignition switch 4. If the combination of the position signal and the pole opposing the Hall element is proper, the Hall element controller 21 provides the shift lever lock controller 22 with an ID signal for unlocking the shift lever. On the other hand, if the combination of the position signal and the pole opposing the Hall element is not proper, the shift lever lock controller 22 does not provide the shift lever lock controller 22 with the ID signal.

In the second embodiment, there are four proper combinations. Combinations other than these four are improper. The first proper combination is the N pole and the LOCK position signal. The second proper combination is no poles and the ACC position signal. The third proper combination is the S pole and the ON position signal. The fourth proper combination is no poles and the START position signal.

When the key rotor 12 is rotated by the key K2 from the LOCK position to the ACC, ON, and START positions and then back to the ON position, the Hall element controller 21 detects the N pole, no poles, the S pole, no poles, and the S pole, respectively. The Hall element controller 21 provides the shift lever lock controller 22 with the ID signal only after sequentially receiving the LOCK, ACC, ON, START, and ON position signals from the ignition switch 4.

The shift lever lock controller 22 is connected to a brake lamp switch 15. The brake lamp switch 15 is activated when a brake pedal (not shown) is depressed and provides the shift lever lock controller 22 with a brake depression signal. When the shift lever lock controller 22 receives the brake depression signal and the ID signal, the shift lever lock controller 22 provides an excitation signal to the shift lever lock solenoid 6. If the shift lever lock controller 22 does not receive either the brake depression signal or the ID signal, the shift lever lock controller 22 provides a de-excitation signal to the shift lever lock solenoid 6.

Shifting of the shift lever is permitted when the shift lever lock solenoid 6 is provided with the excitation signal. On the other hand, shifting of the shift lever is prohibited when the shift lever lock solenoid 6 is provided with the de-excitation signal.

The shift lever lock controller 22 is also connected to the engine ECU 7. When the shift lever lock controller 22 receives the brake depression signal and the ID signal, the shift lever lock controller 22 provides the engine ECU 7 with an engine drive permission signal. If the shift lever lock controller 22 does not receive either the brake depression signal or the ID signal, the shift lever lock controller 22 does not provide the engine ECU 7 with the engine drive permission signal. When the engine ECU 7 receives the engine drive permission signal, in the same manner as in the first embodiment, the engine ECU 7 controls an ignition plug 17 and a fuel injection valve 18 to start the engine and enable the automobile to be driven.

In the second embodiment, the magnets 13a, 13b, the Hall element controller 21, and the shift lever lock controller 22 form a detector. Like the first embodiment, the automobile of the second embodiment does not have a steering wheel lock apparatus.

The operation of the shift lever lock system 200 will now be discussed. The operation of the system 200 when a proper key K2 is inserted into the key rotor 12 of the key cylinder 2 to drive the automobile will now be discussed.

In this case, when the brake pedal is depressed and the key K2 is inserted into the key rotor 12 but not yet rotated, the key rotor 12 is located at the LOCK position. Thus, the N pole of the magnet 13a is opposed to the Hall element 14. The Hall element controller 21 detects the N pole from the level of the detection signal provided by the Hall element 14. In this state, the Hall element controller 21 receives the LOCK position signal from the ignition switch 4.

Then, when the key rotor 12 is rotated to the ACC position, no magnets are opposed to the Hall element 14. The Hall element controller 21 thus detects no poles. In this state, the Hall element controller 21 receives the ACC position signal from the ignition switch 4. When the key rotor 12 is further rotated to the ON position, the Hall element 14 is opposed to the magnet 13b. The Hall element controller 21 thus detects the S pole. In this state, the Hall element controller 21 receives the ON position signal from the ignition switch 4.

When the key rotor 12 is rotated to the START position, no magnets are opposed to the Hall element 14. The Hall element controller 21 thus detects no poles. In this state, the Hall element controller 21 receives the START position signal from the ignition switch 4.

Next, when the key K2 is released, an urging means (not shown), such as a spring, rotates the key rotor 12 from the START position back to the ON position. The key rotor 12 is then held at the ON position. In this state, the Hall element 14 is opposed to the magnet 13b. Thus, the Hall element controller 21 detects the S pole. Further, the Hall element controller 21 receives the ON position signal from the ignition switch 4.

As described above, when the key rotor 12 is sequentially rotated from the LOCK position to the ACC, ON, START, and ON positions, the Hall element controller 21 detects the N pole, no poles, S pole, no poles, and S pole, respectively. Further, the Hall element controller 21 sequentially receives the LOCK, ACC, ON, START, and ON position signals. As a result, the Hall element controller 21 provides the shift lever lock controller 22 with the ID signal for unlocking the shift lever.

The depression of the brake pedal activates the brake lamp switch 15 and provides the shift lever lock controller 22 with the brake depression signal from the brake lamp switch 15. Thus, the shift lever lock controller 22 receives the brake depression signal and the ID signal. Further, the shift lever lock controller 22 provides the shift lever lock solenoid 6 with the excitation signal and the engine ECU 7 with the engine drive permission signal. This excites the shift lever lock solenoid 6, enables control of the engine with the engine ECU 7, and allows the automobile to be started and driven.

The operation of the system 200 when the key rotor 12 is rotated without using a key or without the proper key to start the engine will now be discussed.

In this case, when the ignition switch 4 is not yet rotated, the Hall element controller 21 receives the LOCK position signal from the ignition switch 4.

Since the key K2 has not been inserted into the key rotor 12 of the key cylinder 2, the key rotor 12 is located at the LOCK position. Thus, the magnet 13a is opposed to the Hall element 14, and the Hall element controller 21 receives the N pole.

Then, for example, if the camshaft 23 is directly rotated to rotate the ignition switch 4 to the ACC position, the Hall element controller 21 receives the ACC position signal from the ignition switch 4. In this state, the key rotor 12 has not been rotated and stays at the LOCK position. The Hall element controller 21 thus continues to detect the N pole.

If the ignition switch 4 is further rotated to the ON position, the Hall element controller 21 receives the ON position signal from the ignition switch 4. However, since the key rotor 12 has not been rotated, the Hall element controller 21 still detects the N pole.

When the ignition switch 4 is rotated to the START position, the Hall element controller 21 receives the START position signal from the ignition switch 4. Again, the key rotor 12 has not been rotated. Thus, the Hall element controller 21 detects the N pole.

Subsequently, rotation of the camshaft 23 in the opposite direction returns the ignition switch to the ON position and provides the Hall element controller 21 with the ON position signal from the ignition switch 4. Since the key rotor 12 has not been rotated in this state, the Hall element controller 21 detects the N pole.

As described above, when the Hall element controller 21 sequentially receives the LOCK, ACC, ON, START, and ON position signals from the ignition switch 4, the Hall element controller 21 is always detecting the N pole. In this case, the Hall element controller 21 does not provide the shift lever lock controller 22 with the ID signal for unlocking the shift lever. Thus, the shift lever lock controller 22 provides the shift lever lock solenoid 6 with the de-excitation signal and does not provide the engine drive permission signal to the engine ECU 7. Accordingly, the shift lever is locked. The shift lever thus cannot be shifted. Further, since the engine cannot be started, the automobile cannot be driven.

The second embodiment has the advantages described below.

(1) When trying to start the engine without rotating the key rotor 12 with the proper key K2, the shift lever is locked at the parking (P) position. This prevents unauthorized use of the automobile.

(2) When trying to drive the automobile without using the proper key K2, shifting of the shift lever is prohibited. Further, the engine cannot be started. Thus, the prevention of unauthorized use of the automobile is further guaranteed.

It should be apparent to those skilled in the art that the present invention may be embodied in many other specific forms without departing from the spirit or scope of the invention. Particularly, it should be understood that the present invention may be embodied in the following forms.

In the first embodiment, the immobilizer controller 5 and the engine ECU 7 need not be electrically connected. Even in such case, when an unauthorized attempt to drive the automobile occurs, the immobilizer controller 5 de-excites the shift lever lock solenoid 6, prohibits shifting of the shift lever, and prevents the automobile from being started and driven.

In the second embodiment, the shift lever lock controller 22 and the engine ECU 7 need not be electrically connected. Even in such case, when an unauthorized attempt to drive the automobile occurs, the immobilizer controller 5 de-excites the shift lever lock solenoid 6, prohibits shifting of the shift lever, and prevents the automobile from being started.

In the second embodiment, regardless of the position signal from the ignition switch 4, the ID signal may be provided to the shift lever lock controller 22 only when the Hall element controller 21 detects the magnetic poles in the order of the N pole, no poles, S pole, no poles, and S poles. The magnetic poles are not detected in this order unless the key K2 is used. Thus, the locking of the shift lever prevents unauthorized use of the automobile.

The ID signal may also be provided to the shift lever lock controller 22 only when the Hall element controller 21 detects no poles regardless of the position signals from the ignition switch 4. Alternatively, the ID signal may be provided to the shift lever lock controller 22 only when the Hall element controller 21 detects the S poles regardless of the position signals from the ignition switch 4. In such cases, no poles or S poles are not detected unless the key rotor 12 is rotated by the key K2 (the N pole is detected when the key rotor 12 is not rotated). Therefore, the shift lever is locked if the proper key K2 is not used. This prevents unauthorized use of the automobile.

In the second embodiment, two magnets (the magnets 13a, 13b) and one Hall element (the Hall element 14) are used. However, the number of magnets and Hall elements may be changed as described below.

The number of magnets and Hall elements may be one each. For example, the magnet 13b may be eliminated so that only the magnet 13a is used. In this case, the Hall element controller 21 detects the N pole when the key rotor 12 is located at the LOCK position and detects no poles when the key rotor 12 is rotated to other positions (the ACC, ON, and START positions).

Further, the number of magnets and Hall elements may be two each. For example, a first Hall element opposed to the N pole of the magnet 13a and a second Hall element opposed to the S pole of the magnet 13b may be employed when the key rotor 12 is located at the LOCK position.

As another option, one magnet and two Hall elements may be employed. For example, a first Hall element opposed to the N pole of the magnet 13a when the key rotor 12 is located at the LOCK position and a second Hall element opposed to the N pole of the magnet 13a when the key rotor 12 is rotated to the ON position may be employed.

Alternatively, the number of magnets and Hall elements may be three or more each (e.g., three magnets and three Hall elements, three magnets and four Hall elements, four magnets and three Hall elements, four magnets and four Hall elements).

The prevention of unauthorized use of the automobile is further guaranteed as the number of magnets and Hall elements increases.

In the second embodiment, a key detection switch 25 (shown by the broken lines in FIG. 3) may be provided to detect the insertion of the key K2 in the key rotor 12. When the key detection switch 25 detects the key K2, a predetermined operational voltage may be supplied to the Hall element controller 21. In this case, the Hall element controller 21 is not supplied with the operational voltage as long as the key K2 is not in the key rotor 12. Since the Hall element controller 21 is not activated when the key K2 is not in the key rotor 12, the Hall element controller 21 does not determine whether the relationship between detection signals and position signals is correct.

Instead of the key detection switch 25, a magnet may be arranged so that its N pole (or S pole) opposes the Hall element 14 when the key rotor 12 is rotated to the ACC position. The Hall element 14 provides the Hall element controller 21 with a predetermined operational voltage when the key rotor 12 is located at the ACC position. In this case, the Hall element controller 21 is not activated unless the key K2 is rotated from the LOCK position to the ACC position.

Accordingly, if one tries to start the engine and drive the automobile by rotating the key rotor 12 without using the proper key K2, the shift lever lock controller 22 is not provided with the ID signal. This prohibits shifting of the shift lever and prevents unauthorized use of the automobile.

In the second embodiment, a key interlock solenoid 26 (shown by the broken lines in FIG. 3) for preventing removal of the key K2 when the key rotor 12 is inadvertently rotated from the ACC position to the LOCK position may be employed. When the ID signal is not provided to the shift lever lock controller 22, the key interlock solenoid 26 may permit rotation of the key rotor 12 from the LOCK position to the ACC position and the ON position and prohibit further rotation of the key rotor 12 from the ON position to the START position. In other words, the key cylinder 2 may be locked by the key interlock solenoid 26.

In this case, when the key rotor 12 is sequentially rotated from the LOCK position to the ACC and ON positions, the Hall element controller 21 detects the N pole, no poles, and the S pole, respectively. In this state, the Hall element controller 21 provides the shift lever lock controller 22 with the ID signal only after sequentially receiving the LOCK, ACC, and ON position signals from the ignition switch.

If one tries to start the engine without using the proper key K2, the key rotor 12 cannot be rotated to the START position. Thus, the engine cannot be started. Further, the shift lever cannot be shifted. In other words, if an unauthorized attempt to drive the automobile is made, the shift lever and the key cylinder 2 are both locked. This prevents unauthorized use of the automobile.

In the second embodiment, the Hall element 14 may be arranged in the key rotor 12, and the magnets 13a, 13b may be arranged in the rotor case 11.

In the second embodiment, instead of the Hall element 14, magnetic elements, such as magnetic resistance elements, magnetic diodes, magnetic transistors, and magnetic thyristors, photosensitive elements, such as reflective photointerrupters, and contact elements, such as potentiometers, may be used.

The shift lock apparatus (including the shift lever lock solenoid 6) may be installed in an automobile together with the steering wheel lock apparatus (including the lock bar). In this case, the shift lever and the steering wheel are both locked when one tries to start the engine with an improper key or without using a key. Accordingly, unauthorized use of the automobile is prevented.

When the immobilizer controller 5 determines that the immobilizer identification code does not match the stored identification code or when the shift lever lock controller 22 does not receive the ID signal, the engine may be stopped after a predetermined time (e.g., ten seconds) elapses.

Figure 4:
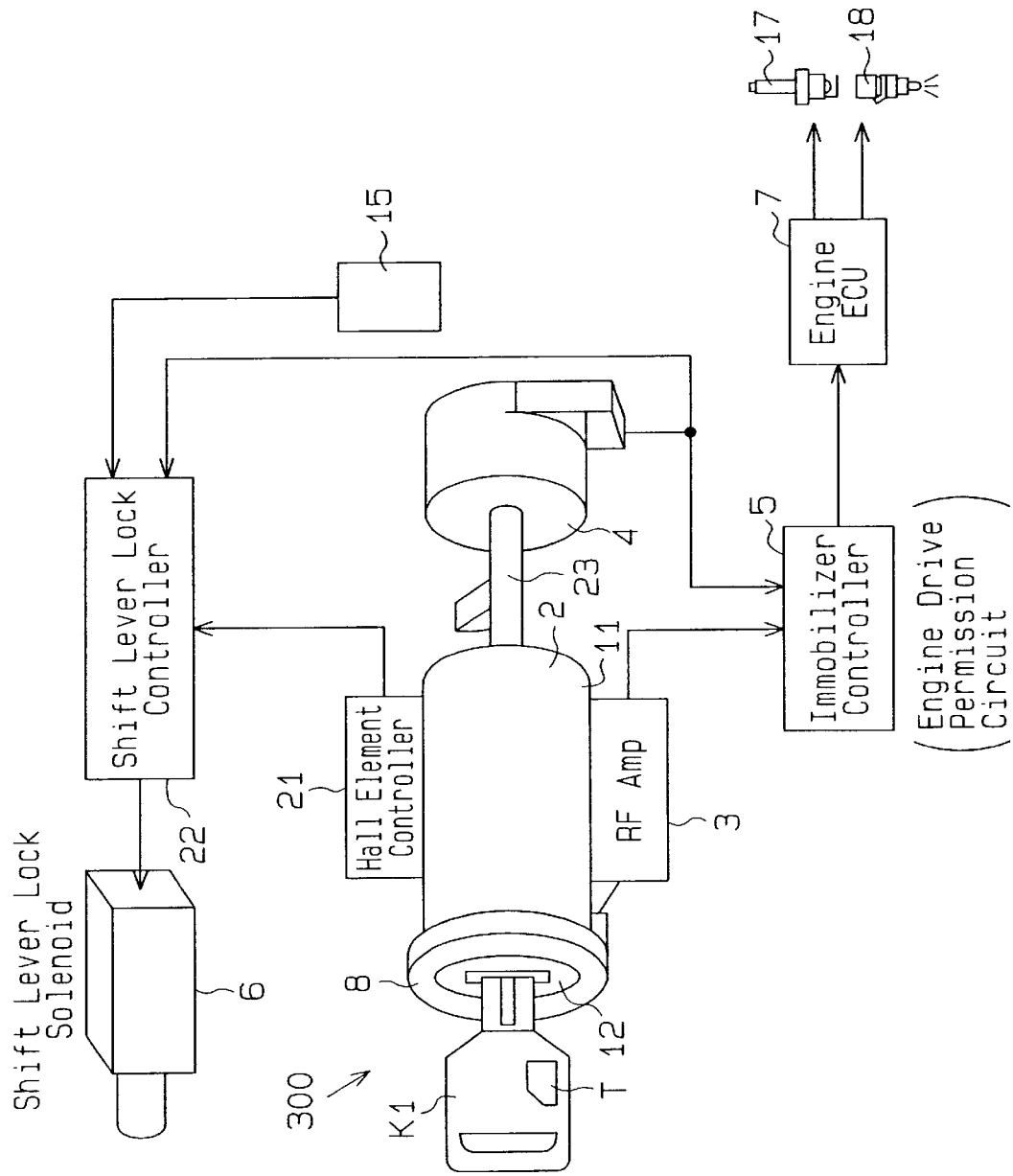
FIG. 4 is a schematic block diagram showing a shift lever lock system according to a further embodiment of the present invention.

With reference to FIG. 4, the functions of the first embodiment and the second embodiment may be combined in a shift lever lock system 300. When the proper immobilizer key K1 is inserted in the key rotor 12 and the immobilizer identification code matches the reference identification code, the immobilizer controller (engine driving permission circuit) 5 provides the engine ECU 7 with the engine drive permission signal. On the other hand, if an improper immobilizer key is inserted into the key rotor 12, the immobilizer controller 5 does not provide the engine drive permission signal to the engine ECU 7. In this case, the EEPROM of the immobilizer controller 5 serves as a memory and the transponder T of the immobilizer key K1 serves as a code transmitter.

Further, when the immobilizer key K1 is used to rotate the key rotor 12 to each position (e.g., the ACC position), the Hall element controller 21 provides the shift lever lock controller 22 with the ID signal for unlocking the shift lever. If the ignition switch 4 is forcibly rotated (improper use), the Hall element controller 21 does not provide the shift lever lock controller 22 with the ID signal.

In this case, if someone tries to steal the automobile without using the proper immobilizer key, the engine cannot be started. Further, if someone tries to steal the automobile by starting the engine without rotating the key rotor 12, the shifting of the shift lever is prohibited. Accordingly, the shift lever lock system 300 has an enhanced ability for preventing unauthorized use of the automobile.

The present examples and embodiments are to be considered as illustrative and not restrictive, and the invention is not to be limited to the details given herein, but may be modified within the scope and equivalence of the appended claims.

What is claimed is:

1. A vehicle immobilizer, comprising:
   a key rotor having a plurality of rotation positions for receiving a key wherein the key is used to rotate the key rotor;
   a rotor case for accommodating the key rotor;
   a shift lever lock mechanism for locking a shift lever; and
   a detector that detects the rotation positions of the key rotor, wherein the detector unlocks the shift lever with the shift lever lock mechanism when the detector detects that the key rotor is rotated to the plurality of rotation positions in a predetermined sequence, wherein the detector includes:
   at least one detected member arranged in one of the key rotor and the rotor case;
   at least one position sensor arranged in the other one of the key rotor and the rotor case to detect the detected member and generate a member detection signal;
   an ignition switch connected to the key rotor for generating a position signal in accordance with the rotation position of the key rotor;
   a determination circuit that generates a determination signal when determining that the member detection signal and the position signal have a predetermined relationship; and
   a controller for unlocking the shift lever with the shift lever lock mechanism when the determination signal is generated and locking the shift lever with the shift lever lock mechanism when the determination signal is not generated.

2. The immobilizer according to claim 1, wherein the controller generates a permission signal for enabling starting of the engine when the determination signal is generated.

3. The immobilizer according to claim 1, wherein the detector further includes a brake detector that generates a depression signal when a brake pedal is depressed, and wherein the controller unlocks the shift lever when the determination signal and the depression signal are both generated and locks the shift lever when at least one of the determination signal and the depression signal is not generated.

4. The immobilizer according to claim 3, wherein the controller generates a permission signal for permitting starting of the engine when the determination signal and the depression signal are both generated.

5. The immobilizer according to claim 1, further comprising:
- a code transmitter incorporated in the key for holding and transmitting a key identification code;
- a memory that stores a reference identification code that is identical to the key identification code; and
- an engine drive permission circuit that receives the key identification code from the code transmitter, comparing the key identification code with the reference identification code, and generating a permission signal to enable starting of the engine when the two identification codes match.

6. A vehicle immobilizer, comprising:
- a key rotor having a plurality of rotation positions for receiving a key wherein the key is used to rotate the key rotor;
- a rotor case for accommodating the key rotor;
- a shift lever lock mechanism for locking a shift lever; and
- a detector that detects the rotation positions of the key rotor, wherein the detector unlocks the shift lever with the shift lever lock mechanism when the detector detects that the key rotor is rotated to the plurality of rotation positions in a predetermined sequence, wherein the detector includes:
- at least one detected member arranged in one of the key rotor and the rotor case;
- at least one position sensor arranged in the other one of the key rotor and the rotor case to detect the detected member and generate a member detection signal in accordance with the rotation positions of the key rotor;
- an ignition switch connected to the key rotor for generating a position signal in accordance with the rotation position of the key rotor;
- a determination circuit that generates a determination signal when determining that the member detection signal and the position signal vary in a predetermined sequence; and
- a controller for unlocking the shift lever with the shift lever lock mechanism when the determination signal is generated and locking the shift lever with the shift lever lock mechanism when the determination signal is not generated.

* * * * *